United States Patent [19]

Andeen et al.

[11] Patent Number: 4,921,393

[45] Date of Patent: May 1, 1990

[54] ARTICULATABLE STRUCTURE WITH ADJUSTABLE END-POINT COMPLIANCE

[75] Inventors: Gerry B. Andeen, Menlo Park; David M. Auslander, Berkeley, both of Calif.

[73] Assignees: SRI International, Menlo Park; The Regents of the University of California, Berkeley, both of Calif.

[21] Appl. No.: 166,095

[22] Filed: Mar. 9, 1988

[51] Int. Cl.$^5$ ............................................. B25I 18/00
[52] U.S. Cl. .............................. 414/729; 414/744.2; 74/479; 901/21; 901/24
[58] Field of Search ............ 414/680, 729, 735, 744.2; 901/50, 21, 23, 24; 74/479

[56] References Cited

U.S. PATENT DOCUMENTS

| | | | |
|---|---|---|---|
| 3,227,290 | 1/1966 | Lemelson | 214/1 |
| 4,327,496 | 5/1982 | Rebman | 33/180 R |
| 4,439,926 | 4/1984 | Whitney et al. | 33/185 R |
| 4,447,048 | 5/1984 | Fischer | 267/141.1 |
| 4,518,307 | 5/1985 | Bloch | 414/729 |
| 4,571,148 | 2/1986 | Drazan | 414/730 |
| 4,603,284 | 7/1986 | Perzley | 318/568 |
| 4,606,691 | 8/1986 | Zalucky | 414/730 X |
| 4,661,039 | 4/1987 | Brenholt | 414/735 |
| 4,666,362 | 5/1987 | Landsberger et al. | 414/735 |
| 4,765,795 | 8/1988 | Rebman | 901/21 X |

FOREIGN PATENT DOCUMENTS

| | | |
|---|---|---|
| 3405168 | 8/1985 | Fed. Rep. of Germany . |
| 518160 | 1/1972 | Switzerland . |
| 1299676 | 3/1987 | U.S.S.R. ............................ 901/21 |
| 8701645 | 3/1987 | World Int. Prop. O. . |
| 8700352 | 12/1987 | World Int. Prop. O. ............ 901/27 |

OTHER PUBLICATIONS

Makino and Furuya (1980), "Selective Compliance Assembly Robot Arm", Proceedings of the First International Conference on Assembly Automation, pp. 77-86, UFS Ltd., Bedford.

Book, Maiza-Neto and Whitney (1975), "Feedback Control of Two Beam, Two Joint Systems with Distributed Flexibility", ASME J. of Dynamics Systems, Measurement, and Control, vol. 97, No. 2, pp. 424-431.

Dubowsky and Gardner (1977), "Design and Analysis of Multilink Flexible Mechanism with Multiple Clearance Connections", ASME J. Engineering for Industry, vol. 99, No. 1, pp. 88-96.

Hennessey, Priebe, Haung and Grommes (1987), "Design of a Lightweight Robotic Arm and Controller", Proceedings of the 1987 IEEE Conference on Robotics and Automation, pp. 779-785.

Balas (1978), "Feedback Control of Flexible System", IEEE Trans., vol. AC-23, No. 4, pp. 673-679.

Cannon and Schmitz (1984), "Initial Experiments on the End-Point Control of a Flexible One-Link Robot", International Journal of Robotics Research, vol. 3, No. 3, pp. 62-75.

(List continued on next page.)

Primary Examiner—Frank E. Werner
Assistant Examiner—Donald W. Underwood
Attorney, Agent, or Firm—Victor R. Beckman

[57] ABSTRACT

A manipulator is disclosed which includes first and second interconnected limb sections, the second section of which is elongated and flexible in at least one direction normal to the longitudinal axis. The first limb section is connected to a base, and the second limb section is connected to an end effector. Relative to a reference frame with origin at the first limb section, the stiffness matrix of the second limb section is variable, and is under motor control. In one embodiment, the second limb section is inflexible in a direction orthogonal to the one direction and the longitudinal axis, and is supported by the first limb section for rotation about the longitudinal axis. In another embodiment, the second limb section is flexible in all directions normal to the longitudinal axis, and a plurality of adjustable-tension stays attached to the second limb section adjacent opposite ends thereof are used to control the stiffness matrix thereof. Methods of damping vibration of the flexible beam are shown.

9 Claims, 5 Drawing Sheets

OTHER PUBLICATIONS

Hastings and Book (1985), "Experiments on the Control of a Flexible Robot Arm", Robots 9 Conference Proc., Jun., Detroit, vol. 2, pp. 20-45 to 20-57.

DeMaria and Siciliand (1987), "A Multilayer Approach to Control of a Flexible Arm", Proceedings of the 1987 IEEE Conference on Robotics and Automation, Raleigh, N.C., Apr., pp. 774-778.

Wang and Vidyasagar (1987), "Control of a Flexible Beam for Optimum Step Response", proceedings of the 1987 IEEE Conference on Robotics and Automation, Raleigh, N.C., Apr., pp. 1567-1572.

Shung and Vidyasagar (1987), "Control of a Flexible Robot Arm with Bounded Input: Optimum Step Responses", Proceedings of the 1987 IEEE Conference on Robotics and Automation, Raleigh, N.C., Apr., pp. 916-922.

Truckenbrodt (1979), "Dynamics and Control Methods for Moving Flexible Structures and their Application to Industrial Robots," Proceedings 5th World Congress on Theory of Machines and Mechanisms, vol. 1, ASME, New York, pp. 831-834.

Futami, Kyura and Hara (1983), "Vibration Absorption Control of Industrial Robots by Acceleration Feedback", IEEE Trans. on Industrial Electronics, vol. IE-30, No. 3, pp. 299-305.

Amazigo (1984), "Forced Three Dimensional Motion of a Deformable Arm", ASME Technical Paper #84, DET 124, ASME, N.Y., N.Y.

ARTICULATABLE STRUCTURE WITH ADJUSTABLE END-POINT COMPLIANCE

TECHNICAL FIELD

This invention relates to an articulatable structure, such as a robot, and more particularly to an articulatable structure with a compliant limb for use in controlling the direction of compliance of end-effector means carried thereby.

BACKGROUND OF THE INVENTION

Compliant structures for use in robots are well known as shown in U.S. Pat. Nos. 4,571,148—Drazan; 4,518,307—Bloch; 4,447,048—Fischer; 4,439,926—Whitney; and 4,327,496—Rebman. Manipulators generally are designed for end-point position control, and their controls have evolved from numerical control techniques pioneered for milling machines and lathes. The essence of the machine tool is the ability to hold the position of the tool independently of the force; the part produced by the machine tool is the same regardless of the size of the chip removed. With the emphasis on position control, limbs are made stiff and are bulky; rigidity being required to hold position independent of the load, and to insure that resonant bending frequencies are beyond the response of the control system. Current robot manipulators are capable of handling payloads on the order of 5% of the robot weight, which value is low compared, for example, to earth moving equipment, factory or construction cranes, and animals. Such a low payload-to-weight has several unfavorable implications. Heavier manipulators are in general more expensive to build and to operate. Not only is more construction material used, but expensive items such as bearings and motors must be larger. Since braking usually is not regenerative, the energy used in manipulator motion, by far the most of which is for motion of the manipulator itself, is lost. Larger manipulators require larger foundations and are less likely to be put on mobile bases. Also, larger manipulators are likely to be more dangerous, simply because of their size.

Compliant structures, such as those shown in the above-mentioned patents, often are used for force control and constrained motion tasks. Generally, compliance is added at or near the end effector of the manipulator. Similarly, hammering has also been done by adding a device at the end of the manipulator that performs the action rather than the manipulator itself. If the manipulator included the necessary compliances, then there would be no need to add compliance structure thereto, and an improvement in payload-to-weight could be realized.

Control systems which take into account compliance in a manipulator arm for increased bandwidth also are known as shown in U.S. Pat. No. 4,603,284—Perzley. Often, the manipulator structure with which the control system is used is not designed to include compliance, the compliance being inherent in the machine structure.

Other robotic manipulators with compliance in the joints also are known. Although compliance in the joints could refer to stiffness of the drive train, it generally is taken to be backdrivability so that the stiffness of the joint can be controlled by the actuator. The usual direction of actuation is for the actuator to move the joint. When the joint can be moved by external forces and move the actuator, then the joint is backdrivable. (Worm gear transmissions are frequently nonbackdrivable, and can be designed to be nonbackdrivable. High gear ratio transmissions in general are nonbackdrivable, and in the above-mentioned sense of the word, hydraulic systems and stepping motor drives also are nonbackdrivable.) Low gear ratio and direct drive electric motors are examples of backdrivability.

The historical trend has been from manipulators designed with rigid limbs and non-backdrivable joints toward the use of manipulators with rigid limbs and backdrivable joints. The well known SCARA (Selective Compliance Assembly Robotic Arm) configuration is of the latter type. Such a configuration is shown, in the publication by Makino, H and N. Furuya (1980), "Selective Compliance assembly Robotic Arm," Proceedings of the First International Conference on Assembly Automation, pp. 77–86. UFS Ltd. Bedford. A key, however, to the SCARA design is the use of vertical axis joints so that the motors are not gravity loaded. This allows the motors to be reasonable in size and minimizes power required to hold position.

Experimental robots having the combination of a compliant limb and backdrivable joints are known as shown in the following publications: Book, W. J., O. Maizza-Neto, D. E. Whitney (1975), "Feedback Control of Two Beam, Two Joint Systems with Distributed Flexibility," ASME J. of Dynamic Systems, Measurement, and Control, Vol. 97, No. 2, pp. 424–431; Dubowsky, S., T. N. Gardner (1977), "Design and Analysis of Multi-Link Flexible Mechanism with Multiple Clearance Connections," ASME J. Engineering for Industry, Vol. 99, No. 1; and Hennessey, M. P., J. A. Priebe, P. C. Huang, and R. J. Grommes (1987), "Design of a Lightweight Robotic Arm and Controller", Proceedings of the 1987 IEEE Conference on Robotics and Automa. Such robots provide for reduced weight while retaining much control capability through the joint actuators.

Also, the broad idea of a robot having compliant limbs and nonbackdrivable joints is known as demonstrated by W. J. Book at the Army Research Office workshop on Kinematics, Dynamics, and Control of Mechanisms and Manipulators, Rensselaer Polytechnic Institute, June, 1986. A position control scheme for use on a single nonbackdrivable joint compliant arm was described by Andeen, G. B., and C. M. Dickinson (1986), "Torque Programming," at the ARO Conference on Kinematics, Dynamics and Control of Mechanisms and Manipulators, RPI, June.

Several researchers have successfully developed control schemes to control the endpoint position of a single flexible link, which schemes are described in the following publications: Balas, M. J. (1978), "Feedback Control of Flexible System," IEEE Trans., Vol. AC-23, No. 4, pp. 673–679; Cannon, R. H. Jr., E. Schmitz (1984), "Initial Experiments on the End-Point Control of a Flexible One-Link Robot," International Journal of Robotics Research, Vol. 3, No. 3, pp. 62–75; Hastings, G. G., and W. J. Book (1985), "Experiments in the Control of a Flexible Robot Arm," Robots 9 Conf. Proc., June, Detroit, Vol. 2, pp. 20–45 to 20–57; De Maria, G. and B. Siciliano (1987), "A Multilayer Approach to Control of a Flexible Arm," Proceedings of the 1987 IEEE Conference on Robotics and Automation, Raleigh, NC., April, pp. 774–778; Wang, D. and M. Vidyasagar (1987), "Control of a Flexible Beam for Optimum Step Response," Proceedings of the 1987 IEEE Conference on Robotics and Automation, Raleigh, NC., April, pp. 1567–1572; and Shung, I. Y. and M. Vidyasagar (1987), "Control of a Flexible Robot Arm with Bounded Input: Optimum Step Responses," Proceedings of the 1987 IEEE Conference on Robotics and Automation, Raleigh, NC., April, pp. 916–922.

Position control schemes for industrial manipulators having multi-degrees of freedom considering only small deflections are described in the following publications: Truckenbrodt, A. (1979), "Dynamics and Control Methods for Moving Flexible Structures and Their Application to Industrial Robots," Proceedings 5th World Congress on Theory of Machines and Mechanisms—Vol. 1, ASME, New York, pp. 831–834; Futami, S., N. Kyura, S. Hara (1983), "Vibration Absorption Control of Industrial Robots by Acceleration Feedback," IEEE Trans. On Industrial Electronics, Vol. IE-30, No. 3, pp. 299–305; and Amazigo, G. O. (1984), "Forced Three Dimensional Motion of a Deformable Arm," ASME Technical Paper #84-DET-124, ASME, NY, NY.

OBJECTS AND SUMMARY OF THE INVENTION

An object of this invention is the provision of an improved articulatable structure such as a manipulator having a compliant limb, together with means for controlling the passive stiffness matrix of the limb relative to a reference frame with origin adjacent one end of the limb.

An object of this invention is the provision of an articulatable structure of the above-mentioned type employing nonbackdrivable joints.

An object of this invention is the provision of novel method and means for damping vibration of a compliant limb of the above-mentioned type.

An object of this invention is the provision of a manipulator that has a substantially higher payload-to-weight ratio than many prior art manipulators.

An object of this invention is the provision of a manipulator which is well adapted for tasks such as insertion, edge following, constrained motion, and the like, which require force control or compliance, which manipulator does not require the inclusion of a separate remote center compliance device, or the like, adjacent the end effector.

The above and other objects and advantages of this invention are achieved by use of a compliant limb as at least one element of an articulatable structure, which limb includes at least first and second axially aligned sections. The second limb section is substantially flexible in at least one direction normal to the longitudinal axis thereof. Means are provided for controlling the passive stiffness matrix of the second limb section relative to a reference frame with origin at the first limb section. In one embodiment of the invention, the second limb section is substantially flexible in one direction normal to the longitudinal axis thereof and is substantially inflexible in a direction orthogonal to the longitudinal axis and said one direction. The first and second limb sections are rotatably interconnected for rotation of said second limb section about its longitudinal axis. Means are provided for rotating said second limb section relative to said first limb section for control of the passive stiffness matrix of the second limb section relative to a reference frame with origin at the first limb section. In another embodiment of the invention, a plurality of adjustable-tension stays are attached to the flexible limb section. Means are provided for controlling tension of the stays thereby controlling the flexibility of said second limb section.

The invention will be better understood from the following detailed description considered with the accompanying drawings.

BRIEF DESCRIPTION OF THE DRAWINGS

In the drawings, wherein like reference characters refer to the same parts in the several views.

Figure 1:
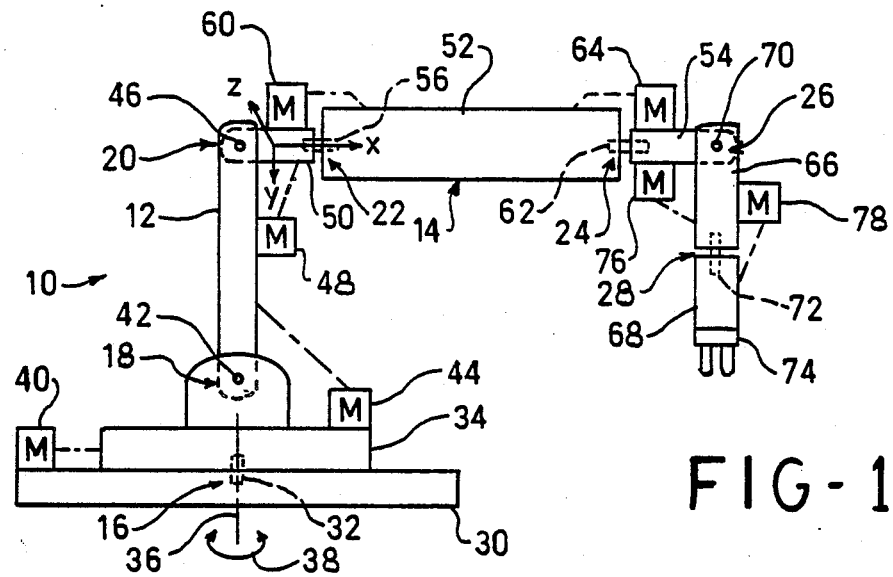
FIG. 1 is a schematic diagram of a manipulator which embodies the present invention.

Reference now is made to FIG. 1 wherein, for purposes of illustration only and not by way of limitation, an elbow manipulator 10 is shown which includes two limbs 12 and 14, and seven joints identified generally by reference numerals 16, 18, 20, 22, 24, 26, and 28. The manipulator includes a base member 30 and a vertically extending pivot 32 for the rotatable support of a base plate 34 about pivot axis 36 in the direction of arrow 38. An actuator such as a highly geared, nonbackdrivable, motor 40 is used for rotating base plate 34 about pivot axis 36 of base joint 16.

Upper limb 12 of the manipulator is pivotally attached to base plate 34 by shoulder joint 18 which includes pivot 42, the axis of which is normal to pivot axis 36. Pivotal movement of shoulder joint 18 is under control of actuator motor 44. Elbow joint 20 for pivotal connection of upper limb 12 to fore limb 14 includes pivot 46, the axis of which is parallel to the axis of pivot 42 of shoulder joint 18. Actuator motor 48 controls pivotal movement of elbow joint 20 about the axis of pivot 46.

The manipulator of this invention includes a novel fore limb 14, the stiffness matrix of which is adjustable. The limb includes axially aligned first, second and third interconnected sections 50, 52 and 54, respectively, the intermediate section 52 of which is flexible. End sections 50 and 54 are substantially rigid, and intermediate section 52 has a considerable difference in stiffness in the two principal directions orthogonal to the longitudinal axis thereof. End section 50 is pivotally attached by pivot 46 of elbow joint 20 to upper limb 12, and joint 22 pivotally connects the elongated intermediate section 52 of fore limb 14 to end member 50. Joint 22 includes pivot 56 having a longitudinal axis in alignment with the longitudinal axis of the elongated section 52. Actuator motor 60 controls rotary movement of elongated section 52 relative to end section 50 about the longitudinal axis of pivot 56 of joint 22.

The other, outer, end section 54 is pivotally connected to the elongated intermediate section 52 by joint 24 which includes pivot 62 having a longitudinal axis in alignment with the longitudinal axis of the elongated section 52. An actuator motor 64 controls relative rotary movement of the end section 54 and elongated compliant section 52 about the axis of connecting pivot 62. Joint 24 and end section 54 comprise elements of a three roll wrist which also includes joints 26 and 28 and links 66 and 68. Link 66 is pivotally connected by pivot 70 of joint 26 to end section 54, and link 68 is pivotally connected by pivot 72 of joint 28 to link 66. An end effector 74, such as a gripper, is attached to link 68. Actuator motors 76 and 78 control pivotal movement of joints 26 and 28 about the longitudinal axes of pivots 70 and 72, respectively. For simplicity of illustration, no motor for operation of end effector 74 is shown. Preferably, but not necessarily, the joint actuators are non-backdrivable, and may comprise, for example, highly geared (60:1 to 100:1) electric motors.

Figure 2:
FIGS. 2 is a perspective view showing a compliant limb element of a type which may be included in the manipulator shown in FIG. 1.

As noted above, limb element 52 has a substantial difference in flexibility in the two principal directions orthogonal to the longitudinal axis thereof. As seen in FIG. 2, to which reference now is made, limb element 52 simply may comprise a slender simple beam having a dimension h in one direction normal to the beam axis that is substantially greater than the dimension w orthogonal thereto. As a result, the beam is substantially rigid in the y direction, and flexible in the z direction when the beam is oriented as illustrated. The broken line position of the beam shows the beam in a flexed position in the z direction. For example only, and not by way of limitation, the beam may differ in principal axis stiffness by a factor of 20 to 30. As seen in FIG. 2, strain gauge means 80 may be located at each end of the beam, which may comprise six sets of strain gauges for measuring bending in the y and z directions and twisting about the x axis.

By including kinematically redundant joints 22 and 24 at opposite ends of compliant beam 52, beam 52 may be rotated about its longitudinal axis simply by rotating joints 22 and 24 at equal rates in opposite rotary directions. The orientation of the end effector 74 is substantially unaltered by such rotation of the beam element. If bending of beam 52 changes with changes in the rotary position thereof due to gravity, then it will be apparent that the position of end effector 74 also will change. If, on the other hand, the longitudinal axis of beam 52 remains straight during rotation thereof, it will be apparent that neither the orientation nor position of the end effector 74 changes with such rotation. Operation of either joint 22 or 24 independently of the other will, of course, result in rotation of the wrist about the limb axis.

With adjustable compliance built into the manipulator, it must be considered in both the design and control thereof. The stiffness of a beam can be described by a symmetric, six-by-six, matrix that relates the relative position and orientation of the ends thereof to the forces and torques required to produce the deflections. The stiffness along the beam is very high, and the off-diagonal coupling terms generally can be ignored. Even so, the relative size of the several terms describes several different kinds of beams that can influence performance and control. Furthermore, the stiffness matrix does not describe wave propagation behavior in beams or the possibility of higher vibration modes.

The passive stiffness matrix of resilient beam 52 is as follows:

$$\begin{bmatrix} Fx \\ Fy \\ Fz \\ Tx \\ Ty \\ Tz \end{bmatrix} = \begin{bmatrix} K11 & K12 & K13 & K14 & K15 & K16 \\ K21 & K22 & K23 & K24 & K25 & K26 \\ K31 & K32 & K33 & K34 & K35 & K36 \\ K41 & K42 & K43 & K44 & K45 & K46 \\ K51 & K52 & K53 & K54 & K55 & K56 \\ K61 & K62 & K63 & K64 & K65 & K66 \end{bmatrix} = \begin{bmatrix} \Delta x \\ \Delta y \\ \Delta z \\ \Delta \theta x \\ \Delta \theta y \\ \Delta \theta z \end{bmatrix}$$

where
F = force,
T = torque,
$\Delta$ = deflection
Kii = diagonal terms,
Kij = Kji = coupling terms and
x, y and z identifies the reference frame with origin at first limb section 50.

Figure 3:
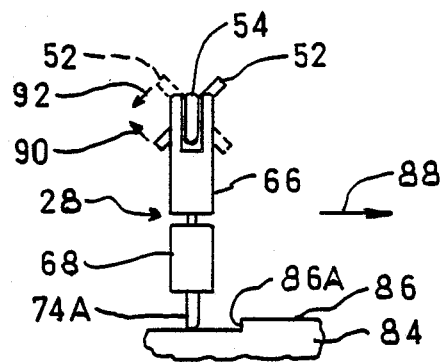
FIG. 3 is a side elevational view of the manipulator shown in FIG. 1 but showing a cam follower instead of a gripper as the end effector.

Use of the novel manipulator of this invention for cam following is illustrated in FIG. 3, to which figure reference now is made. FIG. 3 is a side elevational view from the right side of the manipulator as shown in FIG. 1, except that actuator motors are not shown in FIG. 3, and a cam follower 74A is provided in place of gripper 74. The function of follower 74A is to follow the surface 86 of an object 84. The surface of object 84 is seen to include an obstacle in the form of a step 86A, and follower 74A is shown moving in the direction of arrow 88 along the surface. With the beam 52 rotated to the illustrated full line position, it will be bent diagonally upwardly and rearwardly in the direction of arrow 90 when cam follower 74A engages step 86A. However, with the beam 52 rotated into broken line position, engagement of follower 74A with obstacle 86A will produce a downward and rearward force on beam 52 in the direction of arrow 92 thereby resulting in jamming of follower 74A at the obstacle. The manipulator actuator motors may be provided with shaft encoders, the outputs from which encoders together with outputs from strain gauge means affixed to compliant beam 52, provide information from which the position of cam follower 74A may be determined.

Figure 4:
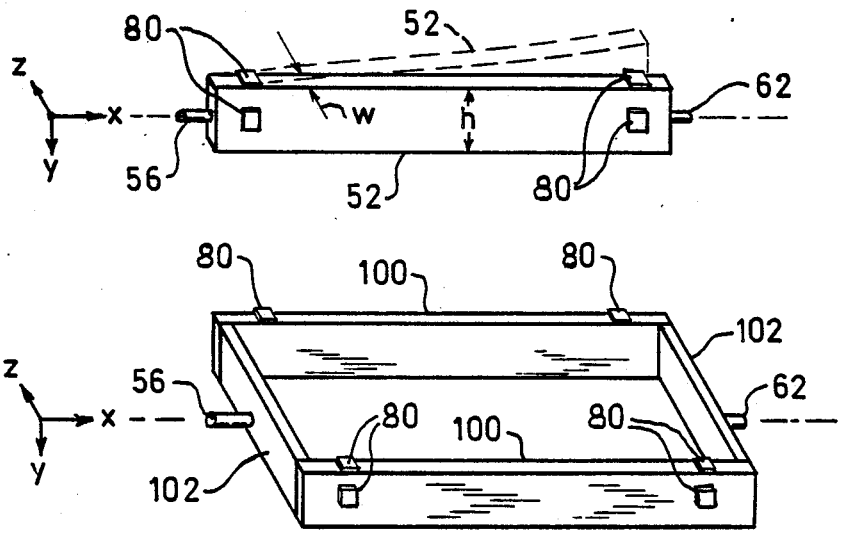
FIG. 4 is a perspective view which is similar to that of FIG. 2 but showing a modified form of compliant limb element.

Obviously, the invention is not limited to use of a slender simple beam such as beam 52 shown in FIG. 2. Other beams having substantial differences in stiffness in the principle direction may be employed; one such beam being shown in FIG. 4, to which figure reference now is made. In FIG. 4 a beam 96 is shown which includes parallel beam elements 100,100 attached to opposite end members 102,102 to provide for a beam in the form of a box. The beam is rotatable about its longitudinal axis which extends along the axes of pivots 56 and 62. As with beam 52 shown in FIG. 2, beam 96 is flexible in the z direction and substantially inflexible in the x and y directions.

Figure 5:
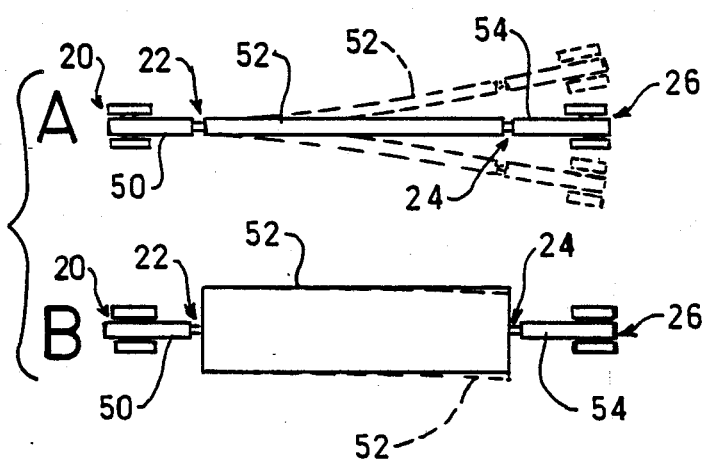
FIG. 5 shows a vibrating slender simple beam in a first position and in a second position rotated 90° about the longitudinal beam axis for use in explaining a vibration damping method.

Any undesired vibration of the asymmetric beam 52 in the system is readily damped by rotation of the beam in a suitable manner described below with reference to FIG. 5 wherein simplified plan views A and B of the manipulator of FIG. 1 are shown. At 5B the compliant beam 52 is shown rotated 90° about its longitudinal axis from the position shown at 5A. At 5A, the vibrating beam 52 is shown at zero deflection in the full line position, and at its opposite maximum deflection points in the broken line positions.

The potential energy at the extreme of the deflection of the vibrating beam is converted to maximum kinetic energy at the point that the beam deflection passes through zero. To damp the vibration, the beam is rotated ¼ revolution in either rotary direction when the beam is at zero deflection. For example, at the full line position shown at 5A, the beam is rotated 90° to the position shown at 5B. This kinetic energy now deflects the beam in the stiff direction, but, obviously, not as much as in the soft direction. Bending of the beam in the stiff direction following rotation thereof is shown in broken lines at 5B. Now, when the velocity becomes zero, at the point that movement in the hard direction changes direction, the beam again is rotated 90° in either direction so that deflection is in the soft direction. This cycle is repeated until the vibrational energy is removed; energy being removed by torque supplied to the remainder of the manipulator upon rotation of the beam. This novel vibration damping is described in greater detail following a description of a manipulator control system.

Figure 6:
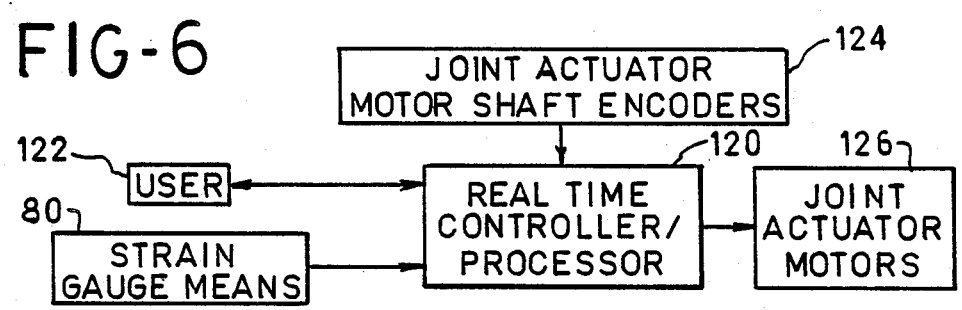
FIG. 6 is a simplified block diagram of a system for control of the manipulator.

A simplified block diagram of a control system for control of the manipulator of FIG. 1 is shown in FIG. 6, to which figure reference now is made. There, a real time controller/processor 120 is shown comprising, for example, a digital computer, together with input and output means 122 for user input and output with the computer, which means may include a keyboard, a monitor, and the like. Outputs from strain gauge means 80 are supplied to controller/processor 120, together with outputs from shaft encoders 124 at the actuator motors for the manipulator joints. Outputs from the controller/processor 120 are supplied to the joint actuator motors, collectively identified by reference numeral 126. Suitable interfaces, not shown, are included in the connections between the controller/processor and the input and output devices.

Control of manipulators with compliant elements has proven to be a difficult task that has been accomplished under limited conditions. In the illustrated embodiment ease of control is facilitated by including compliance in only one of the manipulator limbs. Furthermore, the limb is made light weight compared to the load so that only the beam deflection modes of vibration need to be considered in operation of the control system.

Force control for the manipulator with the compliant limb is straightforward even though the joints are non-backdrivable. Signals from suitably connected elements of strain gauge means 80 are proportional to forces at the outer end of the compliant beam. By closing a feedback loop with strain signals, a desired force can be maintained between the outer end of compliant limb section 52 and an object engaged by the end effector. This force can be maintained without expenditure of energy by the actuator motors thus avoiding the undesirable practice of keeping the motors stalled. Because of the large amount of compliance in limb section 52 in the soft direction, a nearly constant force can be maintained on an object despite small variations in position. Rigid links would require active compliance in a joint to achieve the same benefits.

Figure 7:
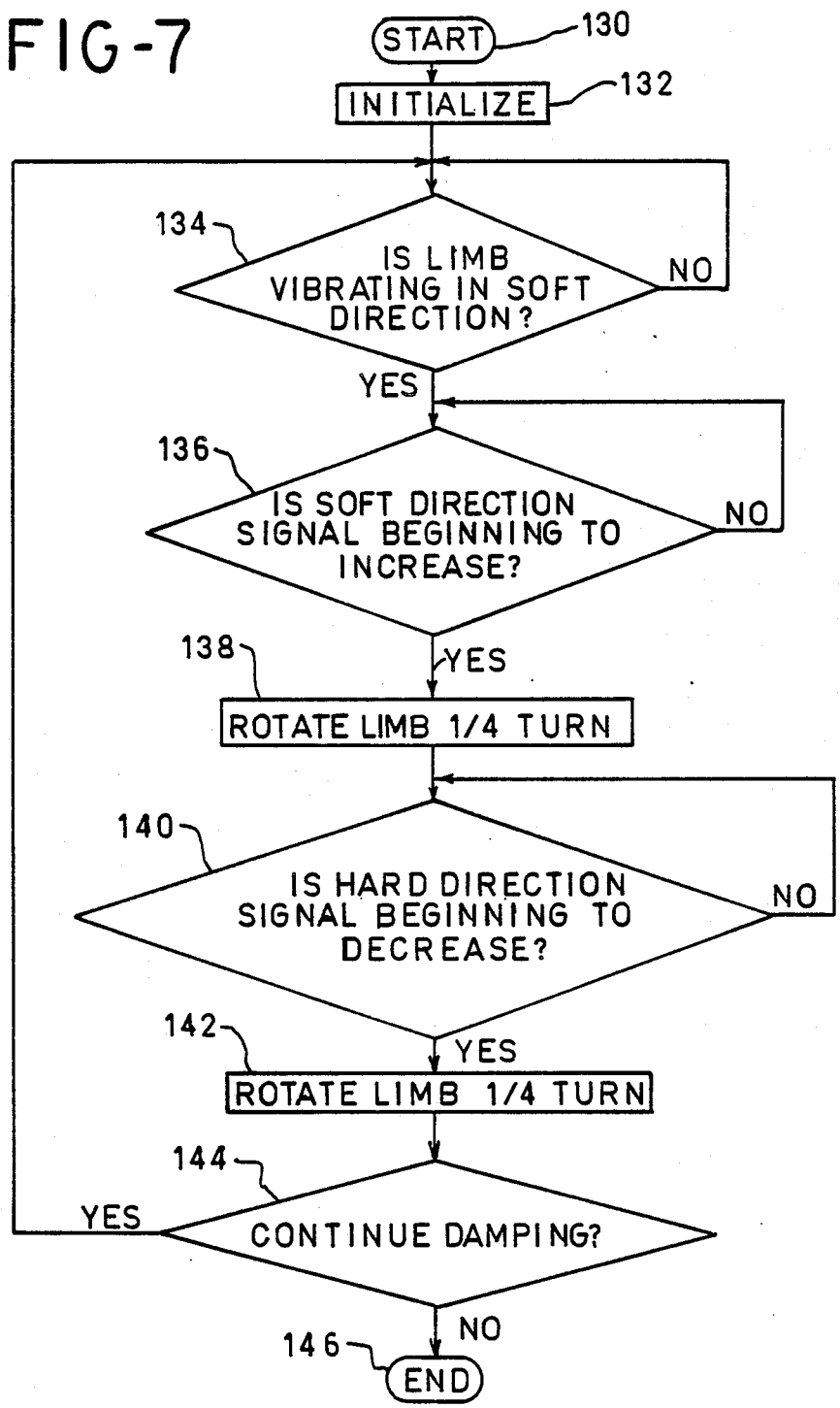
FIG. 7 is a flow diagram for use in explaining operation of the manipulator to damp vibration of the compliant limb element.

As noted above, control schemes for use in controlling the end-point position of manipulators with one or more flexible links are known, and such schemes will not be described here. However, the novel vibration control method involving recurrent rotation of the compliant limb element 90° now will be described in greater detail with reference to the flow diagram of FIG. 7. It will be noted that one or more programming steps may be involved in the actual implementation of the indicated operation. Since the programming of such steps for the indicated operations is well within the skill of the average programmer, a complete program listing is not required and is not included herein.

Operation is started as indicated by START step 130 at which time power is turned on or a reset operation is performed, by means not shown. Initialization step 132 includes initial setting of counters, registers and the like in controller/processor unit 120. Following initiation, decision step 132 is performed to determine whether or not the compliant limb element is vibrating in the soft direction. If the decision is negative, step 134 is again entered. Decision step 134 may be implemented by determining whether the signal output from strain gauge means for measuring deflection in the soft direction varies recurrently.

When decision step 134 is affirmative, decision step 136 is entered to determine whether or not the signal output from strain gauge means for measuring deflection in the soft direction is beginning to increase. If the decision is negative, step 136 is reentered, and if it is affirmative, step 138 is entered at which point the compliant limb element 52 is rotated ¼ revolution by simultaneous energization of actuators 60 and 64 in opposite rotary directions. The strain signal for measurement of soft direction deflection alternately increases and decreases during vibration of the beam, and when the beam is at a center or zero deflection position, the signal begins to increase. Such change in signal is detected at step 136 whereupon limb element 52 is rotated 90° at step 138.

As noted above, when the vibrating beam 52 is rotated 90° when at zero deflection, kinetic energy of the vibrating beam produces deflection in the hard direction. At step 140, which is entered following rotation of the beam at step 138, it is determined whether or not the signal output from strain gauge means for measuring deflection in the hard direction is beginning to decrease. The strain signal for measurement of hard direction deflection will increase following rotation step 138 until maximum deflection is reached, at which time the signal begins to decrease. This change in signal, from an increasing to a decreasing one, is detected at step 140, at which time step 142 is entered to again rotate the limb element 90°. This rotation at step 142 occurs when the kinetic energy of the vibrating beam in the hard direction is substantially zero and the potential energy is substantially maximum, at substantially the maximum deflection point. From step 142, decision step 144 is entered to determine whether or not the damping operation is to continue. If it is not, end step 146 is entered. If damping is to continue, decision step 134 is reentered and the above-described operation from step 134 is repeated.

Figure 8:
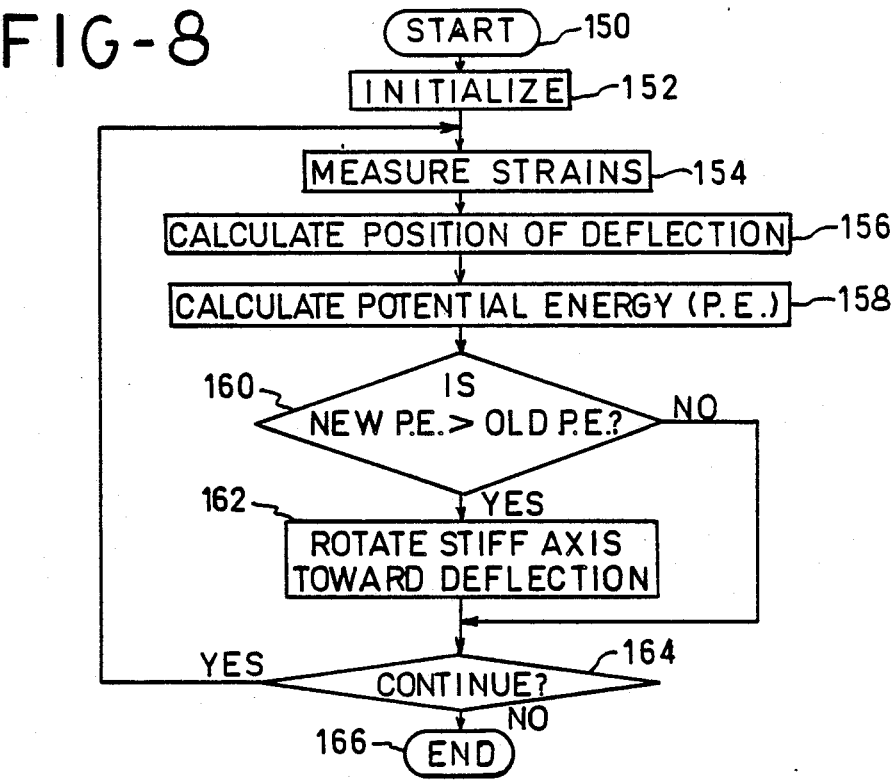
FIG. 8 is a flow diagram which is similar to that of FIG. 7 but showing a modified vibration damping method.

The vibration control method described above with reference to FIG. 7 provides for maximum possible damping. When maximum damping is not required, the modified vibration damping method shown in the flow diagram of FIG. 8 may be used, to which figure reference now is made.

Operation is started at START step 150, followed by initialization step 152. Strains in the soft direction of vibration are measured at step 154 as by use of strain gauges 80 attached to the broad faces of the flexible limb element. Next, at step 156, the position of deflection is calculated using the strain gauge measurements. That is, the beam position relative to the undeflected position is calculated at step 156. Step 158 then is entered where the potential energy of the compliant limb element is calculated for the soft deflection direction; potential energy being maximum at opposite ends of vibratory travel of the flexible beam. Decision step 160 then is performed to determine whether or not the newly calculated potential energy is larger than the previously calculated potential energy. That is, it is determined if the potential energy of the vibrating limb element is increasing or decreasing. If decision step 160 is affirmative, i.e., if the potential energy is increasing, then step 162 is entered whereupon the flexible beam is rotated such that the stiff axis is in the direction of deflection. In the above-described embodiments, this step simply involves rotation of the flexible limb element 90° about its longitudinal axis. From step 162, decision step 164 is entered to determine whether or not the damping operation is to continue.

If decision step 160 is negative, i.e. if the potential energy is decreasing, then no rotation of the flexible limb element takes place, and decision step 164 is entered. If damping is to continue, step 154 is reentered and the above-described operation from step 154 is repeated. If damping is to be discontinued, end step 166 is entered from decision step 164.

Figure 9:
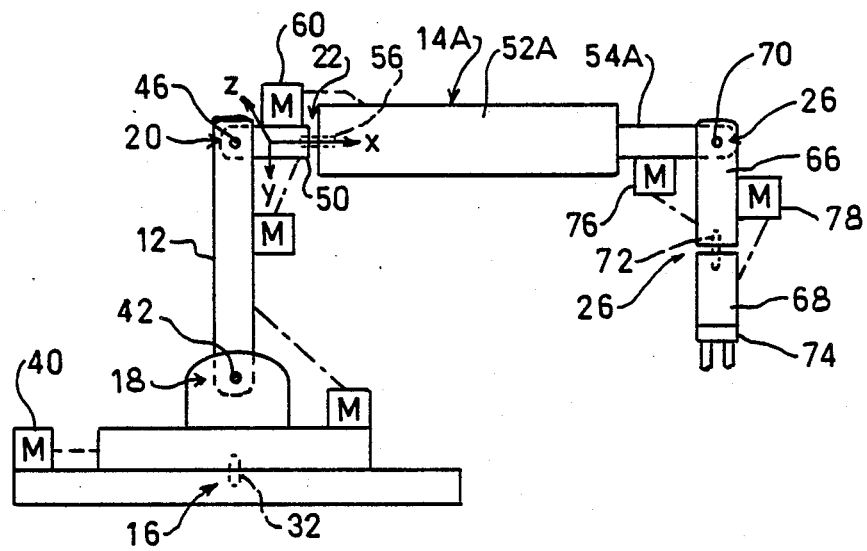
FIG. 9 is a schematic diagram of a manipulator which is similar to that of FIG. 1 but showing a modified form of compliant limb which includes a single rotatable joint instead of a pair of kinematically redundant rotatable joints.

It will be readily apparent that control of the passive stiffness matrix of beam 52 relative to the reference frame with origin at the first limb section 50 is not dependent upon the inclusion of joint 24 in the manipulator. Reference now is made to FIG. 9 wherein a manipulator is shown which is similar in construction to the manipulator shown in FIG. 1 and described above and wherein the same reference characters are used to identify elements which correspond to elements of the FIG. 1 embodiment. In the FIG. 9 embodiment, limb 14A includes first, second and third interconnected sections 50, 52A and 54A. As with the FIG. 1 arrangement, the elongated intermediate section (52A) has a substantial difference in flexibility in the two principal directions (y and z) orthogonal to the longitudinal axis which extends in the x direction. Also, limb sections 50 and 52A are connected for relative pivotal movement about the longitudinal axis, and motor 60 controls such pivot movement.

Unlike the FIG. 1 arrangement, limb elements 52A and 54A are fixedly secured to each other such that relative pivotal movement therebetween is prohibited. With this arrangement, when resilient beam 52A is rotated by operation of motor 60 for controlling the passive stiffness matrix of beam 54A relative to the illustrated reference frame with origin at limb section 50, elements at the outer end of composite limb 14A also are rotated.

Figure 10:
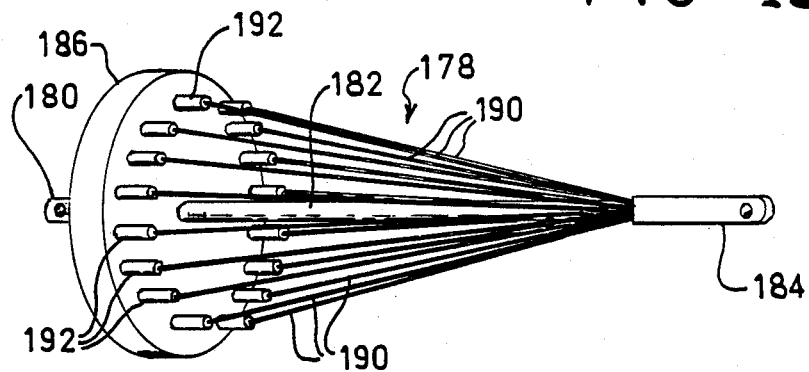
FIG. 10 is a perspective view showing a modified form of compliant limb which includes a plurality of adjustable-tension stays for controlling the stiffness matrix thereof.

The invention is not limited to the use of a rotatably mounted beam for control of the stiffness matrix thereof. A modified form of flexible limb having a controllable passive stiffness matrix is shown in FIG. 10, to which figure reference now is made. There, a limb 178 is shown which includes first, second and third integrally formed sections 180, 182 and 184, respectively. The end sections 180 and 184 are substantially rigid, and the elongated intermediate section 182 is flexible in all directions normal to the longitudinal axis.

Figure 12:
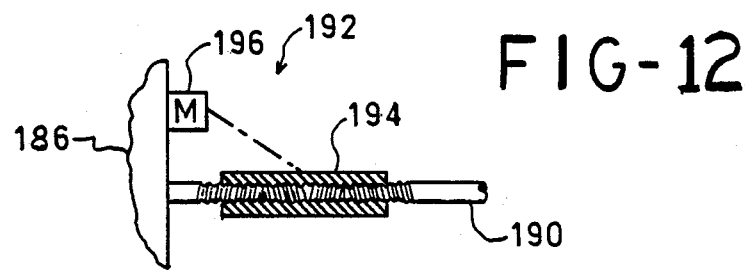
FIG. 12 is an enlarged fragmentary view showing details of means for adjusting tension of the stays included in the compliant limb of FIGS. 10 and 11.

A supporting member 186 in the form of a disc is attached to the limb adjacent one end of the intermediate section 182. Adjustable-tension stays 190 are provided for controlling the stiffness matrix of the limb, which stays extend between the disc and limb. One end of the stays is attached to the limb adjacent the outer end of the intermediate section 182, and the other end thereof is attached to the disc through tension control means 192 arranged in a circle on the disc. In FIG. 12, one of the tension control means is shown comprising a turnbuckle element 194 having an axial threaded bore, the threads of which are of opposite direction at the opposite ends thereof. Motor 196 mounted on the disc is coupled to the turnbuckle element for rotation in either direction for either increasing or decreasing the tension in stays 190. with this arrangement, flexibility of resilient limb section 182 in any direction is controlled by control of tension in the individual stays.

Figure 11:
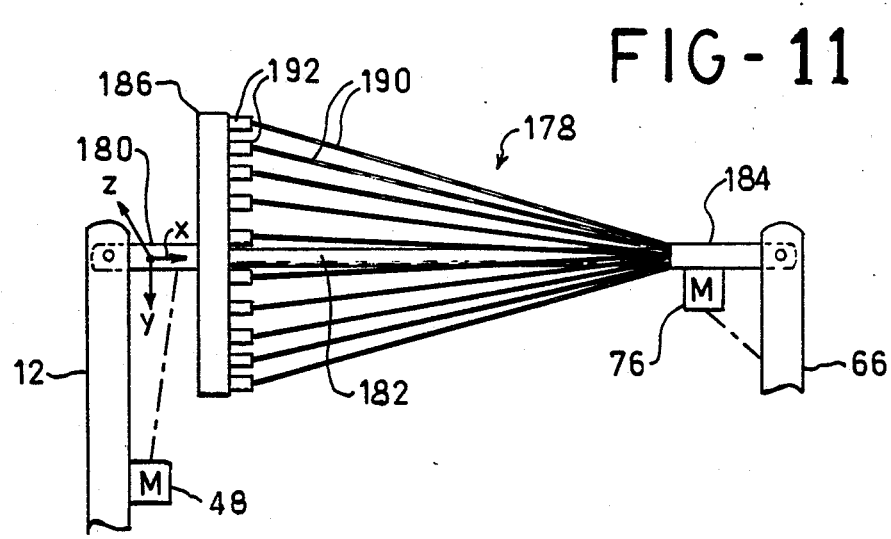
FIG. 11 is a fragmentary side elevational view of a manipulator employing a compliant limb of the type shown in FIG. 10.

In FIG. 11, limb 178 is shown in an articulatable structure in place of limb 14 shown in FIG. 1. The inner end of the limb is pivotally attached to limb 12, and the outer end is pivotally attached to link 66. Strain gauges, not shown, are affixed to the resilient limb section 182 adjacent opposite ends thereof for measuring bending in the y and z directions and twisting about the longitudinal axis. Vibration damping of the resilient beam may be provided in a manner similar to that shown in flow diagrams of FIGS. 7 and 8, described above. Now, however, instead of rotating the resilient beam about its longitudinal axis, the tension in appropriate stays is controlled to provide damping. Beam stiffness in one direction is increased by simply increasing the tension of stays located in the direction in which stiffness is to be increased. Tension in stays located in a direction normal thereto may be simultaneously decreased to maintain flexiblity of the beam. Obviously, other vibration damping means may be provided including, for example, means for simultaneously controlling the tension in all of the stays to either increase or decrease the overall stiffness of the beam.

The invention having been described in detail in accordance with requirements of the patent statutes, various other changes and modifications will suggest themselves to those skilled in this art. For example, the novel resilient limbs of this invention may be included in more than one limb of a manipulator. In the FIG. 1 embodiment, for example, a resilient limb with controllable stiffness may be substituted for rigid limb 12. Alternatively, the manipulator fore limb may be of the rigid type and the upper limb of the type embodying this invention.

Also, beam 182 may be of the same type as beam 52 which is substantially flexible in only one direction normal to its longitudinal axis. Then, adjustable-tension stays for controlling flexibility in only said one direction would be required. In addition, a single motor may be used for simultaneous control of the intermediate limb section 52 relative to both said end sections 50 and 54, if desired.

It is intended that the above and other such changes and modifications shall fall within the spirit and scope of the invention as defined in the appended claims.

We claim:

1. An articulatable structure for support of end effector means comprising, base means, an elongated limb comprising axially aligned first and second interconnected limb sections, said second limb section being elongated, resilient and flexible in at least one direction normal to the longitudinal axis thereof during use thereof, said second limb section being substantially inflexible in a direction orthogonal to said longitudinal axis and said one direction, rotatable coupling means for rotatably interconnecting said first and second limb sections for relative rotation about said longitudinal axis, means for connecting said first limb section to said base means, means for connecting said second limb section to end effector means, and motor means for rotating said second limb section relative to a reference frame with origin at the first limb section for controlling the passive stiffness matrix of the second limb section relative to said reference frame, which motor means is energized only when the passive stiffness matrix is being changed by said motor means and is deenergized during times that the passive stiffness matrix is not being changed during periods between changes in the passive stiffness matrix.

2. An articulatable structure as defined in claim 1 wherein said limb comprises the forearm of a robot.

3. An articulatable structure as defined in claim 1 wherein said first limb section is substantially rigid.

4. An articulatable structure as defined in claim 1 wherein said limb includes a third limb section connected to said second limb section, which third limb section is included in said means for connecting said second limb section to end effector means.

5. An articulatable structure as defined in claim 4 wherein said first and third limb sections are substantially rigid.

6. An articulatable structure as defined in claim 5 including rotatable coupling means for rotatably interconnecting said second and third limb sections for relative rotation about said longitudinal axis, and motor means for rotating said third limb section relative to said second limb section.

7. An articulatable structure as defined in claim 4 wherein said limb comprises the forearm of a robot.

8. An articulatable structure as defined in claim 7 including wrist means attached to said third limb section, which said wrist means is included in said means for connecting said second limb section to end effector means.

9. A limb for use in an articulatable structure such as a robot, or the like, comprising a first limb section, an elongated second limb section which, during use, is resilient and flexible in one direction normal to its longitudinal axis and is substantially inflexible in a direction normal to both said one direction and said longitudinal axis, rotatable coupling means for rotatably coupling said first and second limb sections for relative rotation thereof about said longitudinal axis, motor means operatively connected between said first and second limb sections for rotating said second limb section relative to said first limb section about said longitudinal axis and controlling the passive stiffness matrix of the second limb section in two orthogonal directions normal to said longitudinal axis relative to a reference frame with origin at the first limb section, a third limb section in axial alignment with said first and second limb sections, rotatable coupling means for rotatably coupling said second and third limb sections for relative rotation thereof about said longitudinal axis, said rotatable coupling means for rotatably coupling said first and second limb sections and said rotatable coupling means for rotatably coupling said second and third limb section being kinematically redundant, and motor means operatively connected between said second and third limb sections for rotating said third limb section relative to said second limb section about said longitudinal axis, said motor means for rotating said second limb section relative to said first limb section and said motor means for rotating said third limb section relative to said second limb section being simultaneously operable such that the second limb section is simultaneously rotatable relative to both said first and third limb sections while said first and third limb sections are relatively rotatably stationary for controlling the passive stiffness matrix of the second limb section relative to a reference frame with origin at the first limb section.

* * * * *